US010625328B2

(12) United States Patent
Babalo et al.

(10) Patent No.: US 10,625,328 B2
(45) Date of Patent: Apr. 21, 2020

(54) SYSTEM OF ELECTRO HYDRO CLINCHING

(71) Applicants: Vahid Babalo, Karaj (IR); Mahdi Soltanpour, Karaj (IR); Ali Fazli, Qazvin (IR); Rasoul Jelokhani Niaraki, Qazvin (IR)

(72) Inventors: Vahid Babalo, Karaj (IR); Mahdi Soltanpour, Karaj (IR); Ali Fazli, Qazvin (IR); Rasoul Jelokhani Niaraki, Qazvin (IR)

( * ) Notice: Subject to any disclaimer, the term of this patent is extended or adjusted under 35 U.S.C. 154(b) by 215 days.

(21) Appl. No.: 15/918,282

(22) Filed: Mar. 12, 2018

(65) Prior Publication Data
US 2018/0200775 A1 Jul. 19, 2018

(30) Foreign Application Priority Data
Aug. 20, 2017 (IR) .................. 139650140003006277

(51) Int. Cl.
*B23P 11/00* (2006.01)
*B21D 39/03* (2006.01)
*B23Q 5/033* (2006.01)
*B21D 26/12* (2006.01)

(52) U.S. Cl.
CPC ......... *B21D 39/031* (2013.01); *B21D 39/032* (2013.01); *B23Q 5/033* (2013.01); *B21D 26/12* (2013.01)

(58) Field of Classification Search
CPC . B23Q 3/00; B23Q 3/06; B23Q 3/082; B23Q 3/069; B23Q 3/1543
See application file for complete search history.

(56) References Cited

U.S. PATENT DOCUMENTS

| | | | |
|---|---|---|---|
| 5,722,139 A * | 3/1998 | Ladouceur | B23P 19/062 29/243.518 |
| 6,601,750 B2 | 8/2003 | Palladino et al. | |
| 6,708,542 B1 | 3/2004 | Gafri et al. | |
| 6,921,444 B2 | 7/2005 | Joaquin et al. | |
| 7,065,854 B2 | 6/2006 | Gerfast | |
| 8,024,848 B2 * | 9/2011 | Carter | B21D 39/031 29/243.5 |
| 8,528,187 B2 * | 9/2013 | Wang | B21D 39/031 29/283.5 |
| 8,640,321 B2 * | 2/2014 | Carter | B21D 39/031 29/243.5 |
| 9,266,190 B2 | 2/2016 | Bonnen et al. | |
| 9,669,453 B2 | 6/2017 | Freis | |
| 2013/0302107 A1 | 11/2013 | Burton | |
| 2016/0039041 A1 | 2/2016 | Bonnen et al. | |
| 2016/0271724 A1 | 9/2016 | Golovashchenko et al. | |

(Continued)

*Primary Examiner* — Lee D Wilson
(74) *Attorney, Agent, or Firm* — NovoTechIP International PLLC

(57) ABSTRACT

An improved electro-hydraulic clinching system involves generating, through a high potential electric shock, a forceful wave in a fluid such as water, and applying the force of the wave to a sheet of metal. The force of the wave results in deforming the sheet and making the sheet material move through a hole in a second sheet adjacent to the first sheet, thus joining the two sheets. In an alternative implementation, in which neither sheet includes an opening, the force of the wave moves both sheets simultaneously, thereby causing them to join together at the point of impact.

20 Claims, 9 Drawing Sheets

(56) References Cited

U.S. PATENT DOCUMENTS

2016/0346829 A1  12/2016  Badent et al.
2017/0095855 A1   4/2017  Niaraki et al.
2018/0200775 A1*  7/2018  Babalo ................. B21D 39/031

* cited by examiner

SYSTEM OF ELECTRO HYDRO CLINCHING

CROSS REFERENCE TO RELATED APPLICATION

This application claims the benefit of priority to Iran patent application serial number 139650140003006277, which was filed on Aug. 20, 2017, and is incorporated by reference herein in its entirety.

TECHNICAL FIELD

The present application relates generally to joining parts, and more particularly to an improved system of electro-hydraulic clinching, among other things, metal sheets.

BACKGROUND

One of the most common methods of reducing the weight of vehicles and airplanes is to use parts made of lightweight alloys that provide higher strength and increased stiffness. Although these materials provide multiple advantages, they are generally difficult to shape and to join together.

Several different types of joining methods have been developed for joining such materials. For example, mechanical joints, such as rivets or clinch joints, are sometimes used to join lightweight alloys of dissimilar materials. However, the strength, durability, and corrosion resistance of such joints may not be the same as the properties of welds between the parts. To avoid this, methods have been developed for clinching the different alloys together. Clinching is a bulk-sheet metal-forming process aimed at joining metal sheets together without additional components, using special tools to plastically form an interlock between two or more sheets. Although clinching avoids the disadvantages of using mechanical joints, it cannot always be practically used as it is difficult to perform on materials that do not exhibit high degrees of ductility, are thin or have complex shapes. Moreover, the process of clinching is time consuming and often expensive.

Therefore, a need exists for providing an improved system of clinching alloys and other materials that is easy to use and can be performed on thin sheets and reduces time and expense.

SUMMARY

An electro-hydraulic clinching system for joining a first sheet to a second sheet is provided. In one implementation, the system includes a movable casing having a positioning rod for aligning a hole in the first sheet with a die cavity of the movable casing, a pressure chamber including a cavity for housing a fluid, two opposing electrodes, one located on one side of the pressure chamber cavity and the other located on the other side of the pressure chamber cavity, a channel for inputting the fluid in the cavity for housing the fluid, wherein a discharge of electric current between the two opposing electrodes creates a shock wave in the fluid that causes the fluid to move with force against the second sheet, and the force causes deformation in the second sheet by moving materials of the second sheet into the hole of the first sheet thereby joining the first and second sheets.

In another implementation, the system includes a casing, a pressure chamber including a cavity for housing a fluid, two opposing electrodes, one located on one side of the cavity for housing the fluid and the other located on the other side of the cavity for housing the fluid, a channel for inputting the fluid in the cavity for housing the fluid, and a movable piston positioned on top of the cavity for housing the fluid, wherein an electric discharge between the two opposing electrodes creates a shock wave in the fluid that causes the fluid to move against the piston causing the piston to move and thereby create a force against the second sheet and the first sheet positioned on top of the second sheet, and the force causes deformation in the first sheet and the second sheet by moving materials of the first sheet and the second sheet into a die cavity of the casing thereby joining the first sheet to the second sheet.

BRIEF DESCRIPTION OF THE DRAWINGS

Features of the subject technology are set forth in the appended claims. However, for purpose of explanation, several implementations of the subject technology are set forth in the following figures.

DETAILED DESCRIPTION

Figure 1:
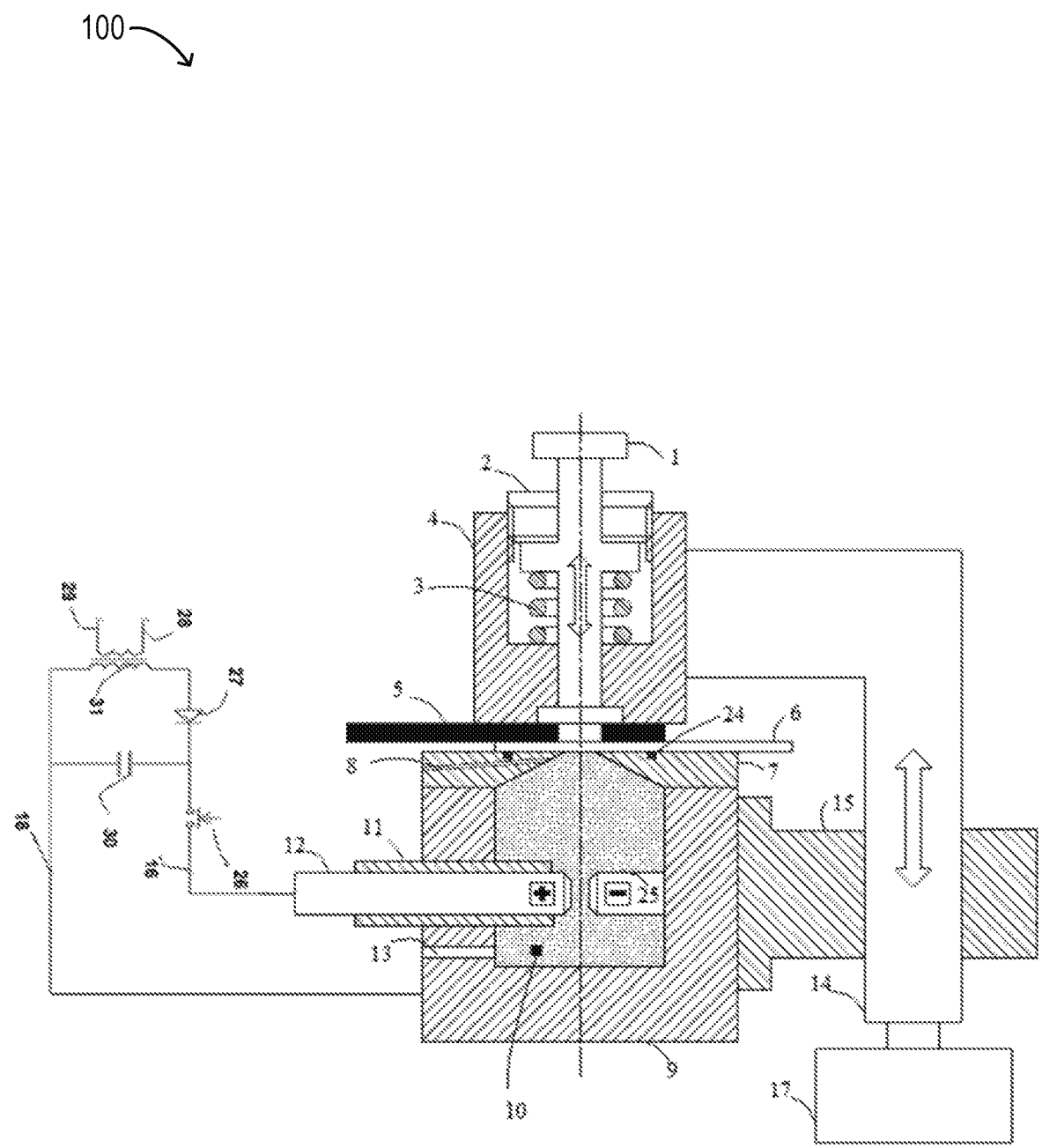
FIG. 1 is a schematic drawing of an improved electro-hydraulic clinching system, according to an implementation.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings. As part of the description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

Recent demands for effective and efficient use of energy and resources have led to an increase in producing lightweight structures using ultra-light materials such as aluminum, magnesium, titanium, advanced high strength steel and more. There is also sometimes a need for utilizing two different materials that have different strengths in each section of a structure. This creates a challenge in joining the different parts of a structure together. Common processes in the field of joining metal alloys such as spot welding, adhesive bonding, rivets, and the like are often difficult to use for lightweight materials, and particularly challenging when used to join parts made from different materials. For example, aluminum is not easy to weld due to its high thermal conductivity, melting point and oxide layers. The welding of parts made from different materials can also be very difficult due to different melting points. Clinching is a process used for joining various metal parts that overcomes some of the challenges of joining lightweight alloys. However, clinching is difficult to perform on materials having low ductility and in particular for parts having small thickness. Moreover, clinching requires a high binding force.

A solution is proposed here to solve these issues and more by providing an improved and system of electro-hydraulic clinching. In one embodiment, the improved electro-hydraulic clinching system involves generating, through a high electric shock, a forceful wave in a fluid such as water and applying the force of the wave to a sheet of metal. The force of the wave, in one implementation, results in deforming the sheet and making its material move through a hole pierced in a second sheet placed adjacent to (either on top or on the bottom of) the first sheet, thus joining the two sheets. In an alternative implementation, in which neither sheet includes a hole, the force of the wave moves both sheets simultaneously thus causing them to join together at the point of impact. This process of joining two parts can be performed at a high speed, thus resulting in improved formability and efficiency and lower costs. Moreover, the process can be used efficiently on parts made from materials having low ductility and/or having low thickness.

FIG. 1 illustrates one implementation of an improved electro-hydraulic clinching system 100. Herein, system 100 includes a movable positioning rod 1 which is housed in a movable casing 4. The movable casing 4 is cylindrical, in one implementation, and includes a cavity through which the movable positioning rod 1 can move. The movable positioning rod 1 can move up and down, in one implementation, to correctly align a hole in a first sheet 5 with a die cavity of the movable casing 4. System 100 also includes a spring 3 for returning the positioning rod 1 to its original position, after alignment is done. A nut 2 is used to adjust the height of the positioning rod 1 such that the lower end of the positioning rod 1 can be adjusted for proper positioning relative to the die cavity of the casing 4. In one implementation, the movement of the casing 4 is controlled by a clamping system 17. The clamping system 17 includes a movable arm 14, attached to the movable casing 4. In one implementation the clamping system 17 is a mechanical system which controls the movement of the arm 14. Alternatively, the clamping system 17 may be a hydraulic or electrical system or a combination of both. The details and operation of such a clamping system are known in the art and will not be discussed here in detail.

In one implementation, before being placed inside the system 100, a hole is created in the first sheet 5. To join the two sheets, in one implementation, the second sheet 6, which does not include a similar hole is first placed underneath the movable casing 4, followed by the first sheet 5 which is placed on top of the second sheet 6. In one implementation, care is taken to place the hole of the first sheet 5 concentric with the die cavity of the movable casing 4 such that when the casing 4 is lowered to be placed on the surface of the first sheet 5, a die cavity of the casing 4 is aligned with the hole of the first sheet 5.

In one implementation, the bottom portion of the system 100 includes a pressure chamber 9 having a large cavity for housing a fluid 10. The fluid 10 can be any conductive fluid, such as water. In one implementation, the cavity of the pressure chamber 9 has a cylindrical or any other shape body attached to a cone-shaped head for concentrating the force of the fluid 10 at the top. The pressure chamber 9 includes a channel 13 having an opening on the outer surface of the pressure chamber 9 and an opening in the large cavity of the pressure chamber 9 for creating a path through which a fluid can travel from the outside into the pressure chamber. In one implantation, the opening of the channel 13 on the outer surface of the pressure chamber 9 can be connected to a pipe or other element through which a fluid can pass to enter the cavity of the pressure chamber 9. In one implementation, the pressure chamber 9 also includes an output channel 8 through which any air trapped inside the cavity can exit as the cavity of the pressure chamber 9 is filled with the fluid 10. An O-ring 24 seals the fluid 10, preventing its leakage between the second sheet 6 and the wave concentrator 7. Once the cavity is filled with the fluid 10, the opening of the channel 13 on the outer surface of the pressure chamber 9 can be plugged or otherwise closed to prevent the fluid from exiting the cavity.

In one implementation, the bottom portion of the system 100 also includes a wave concentrator 7 on the outer surface of which the second sheet 6 can be placed. The wave concentrator 7 includes an opening on the top which is connected to an opening of the cavity of the pressure chamber 9 through which the fluid 10 can move. The shape of the wave concentrator 7, in one implementation, is configured to reinforce the cone-head shape of the cavity of the pressure chamber 9, resulting in an increased concentration of force at the top of the cavity. A guide 15 is used to connect the two upper and lower sections of the system 100. Arm 14 can move the movable casing 4 through an opening in the guide 15.

In one implementation, the electrode 12 is insulated from the body of pressure chamber using the insulator 11. An opposing electrode 25 is located across the cavity of the pressure chamber 9 to generate an electric charge in the fluid 10. In one implementation, the electrode 12 is connected to a switch 26 which is in turn connected to a capacitor 30 and a diode 27. The capacitor 30 is a high capacity capacitor which can store a large amount of energy. The capacitor 30 is connected to the pressure chamber 9 through an electrical connection 18. The diode 27 and capacitor 30 are both connected to a high voltage transformer 31. When the diode 27 conducts, the high voltage transformer 31 becomes connected to the capacitor 30. Closing the switch 26 then causes the large amount of electrical energy stored in the capacitor 30 to create a large potential difference between the electrodes 12 and 25, which leads to an electrical discharge between the electrodes. This creates a plasma channel between the electrode 25 and the electrode 12. The sudden expansion of this plasma channel can create a shock wave in the fluid 10, which spreads throughout the fluid 10 in the cavity and moves up to strike the second sheet 6. The concentrated energy and sudden force of the charged fluid 10 causes a deformation in the second sheet 6 such that the second sheet 6 passes through the predrilled hole of the first sheet 5 and enters the die cavity of the movable casing 4. Due to the shape of the die cavity of the casing when the second sheet 6 touches the bottom of the die cavity, further axial movement of the second sheet 6 is not possible. As a result, when moving through the predrilled hole of the first sheet 5, the second sheet 6 flows radially and as such fills the hole of the first sheet. This leads to a connection between the first sheet 5 and the second sheet 6 at the hole of the first sheet 5. Any air trapped in the die cavity of the casing 4 is removed from lateral pores of the direction positioning rod 1, when the positioning rod 1 is moved up.

Figure 2A:
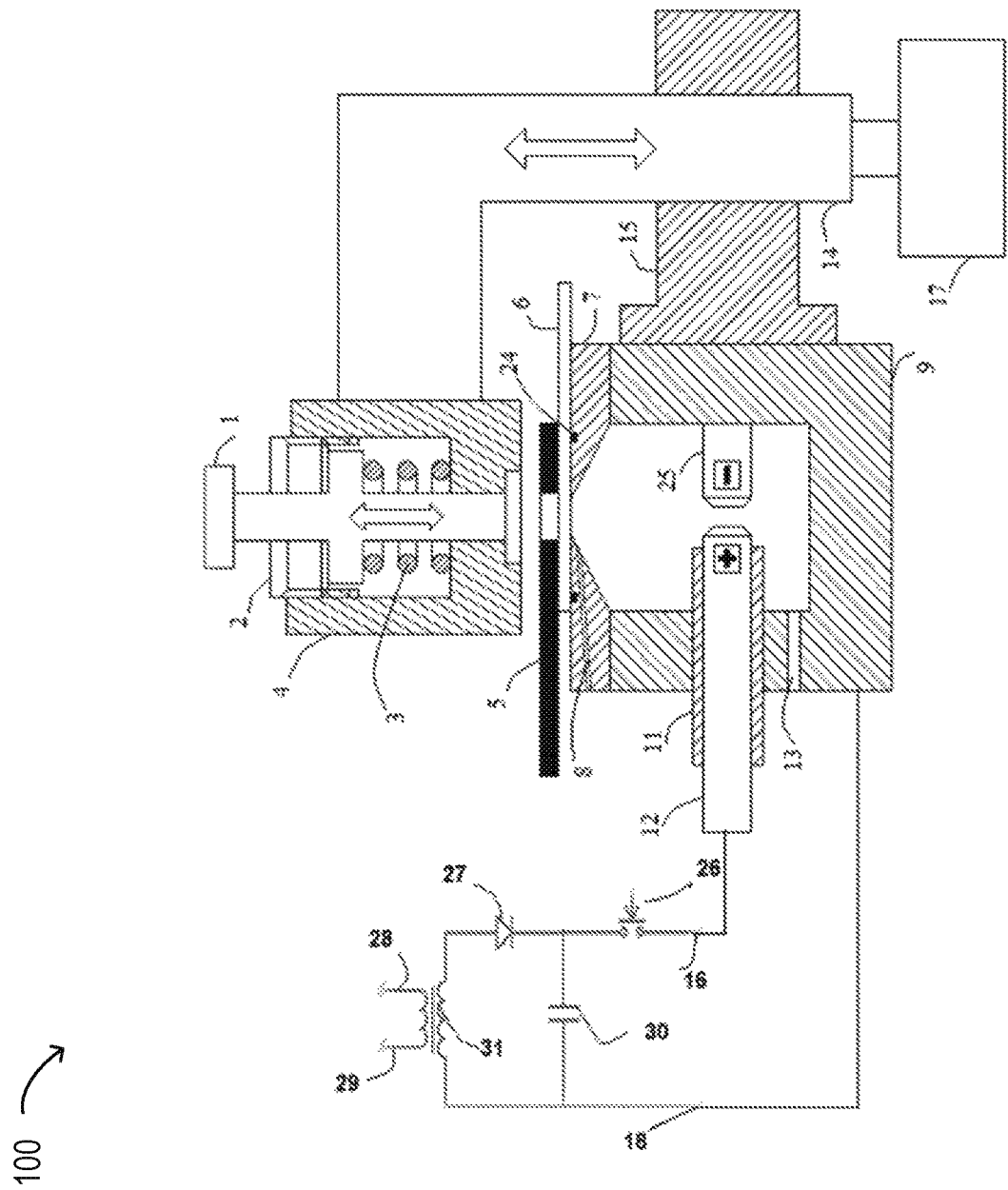
FIGS. 2A-2D are schematic drawings of four different stages of an improved electro-hydraulic clinching method performed by one implementation of the improved electro-hydraulic clinching system.
Figure 2B:
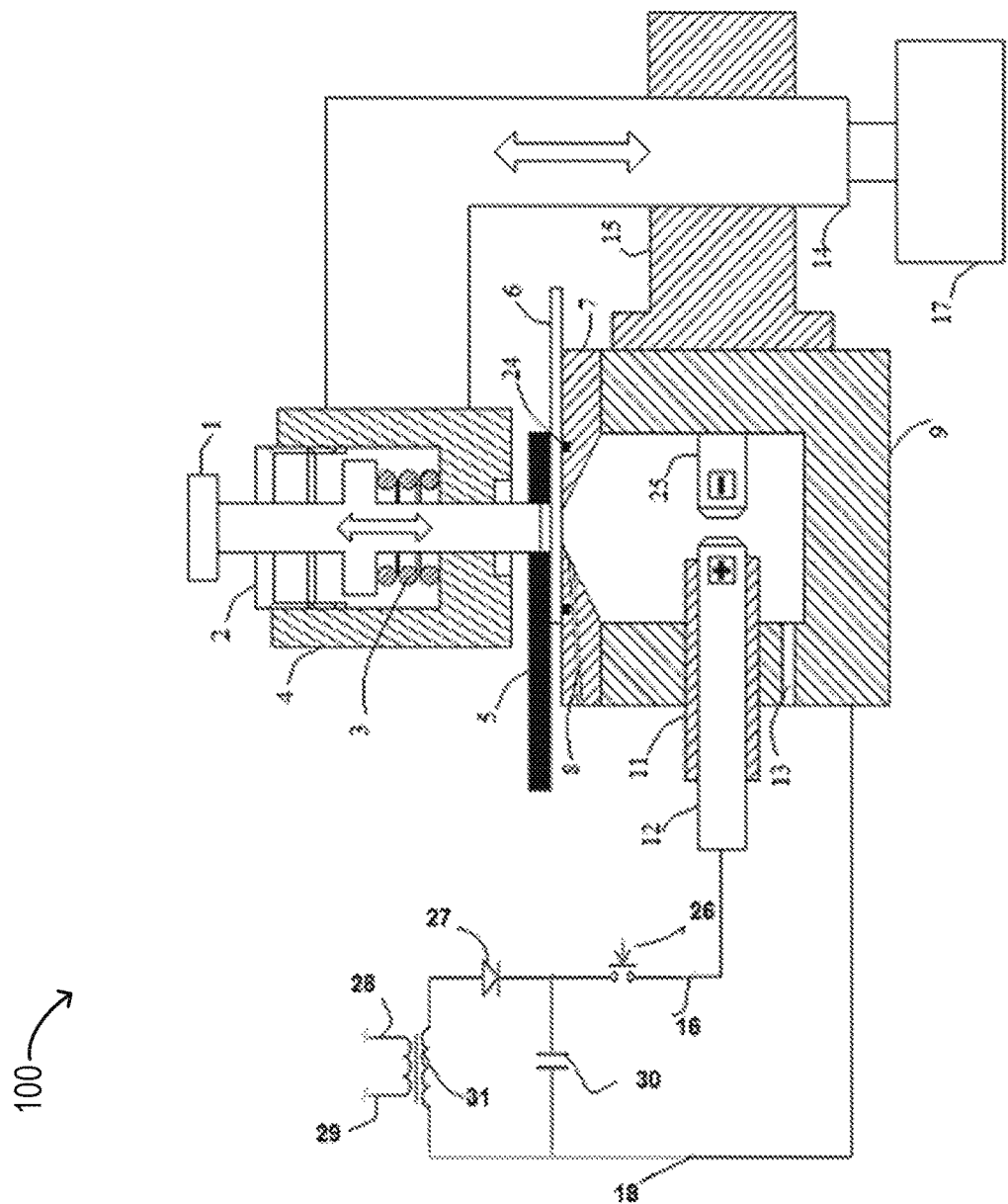
Figure 2C:
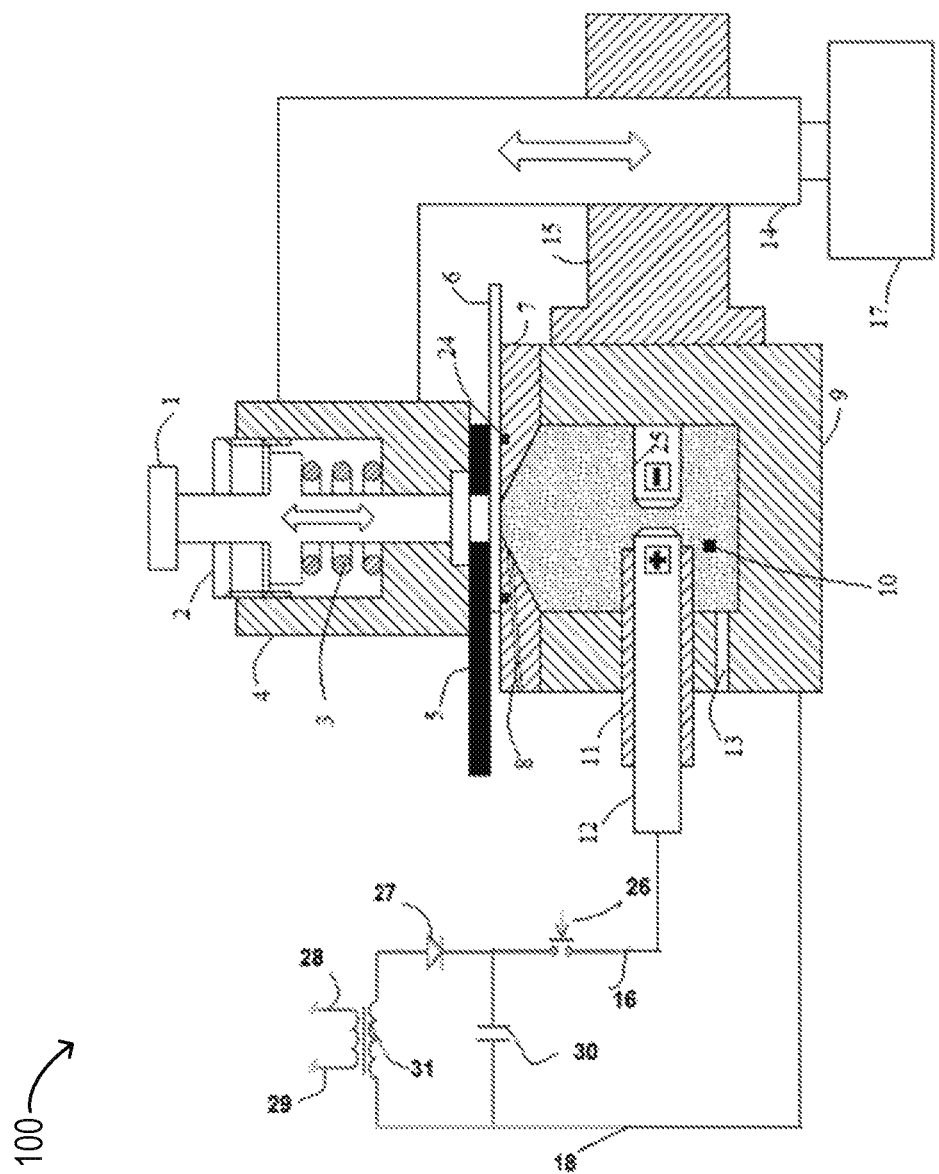
Figure 2D:
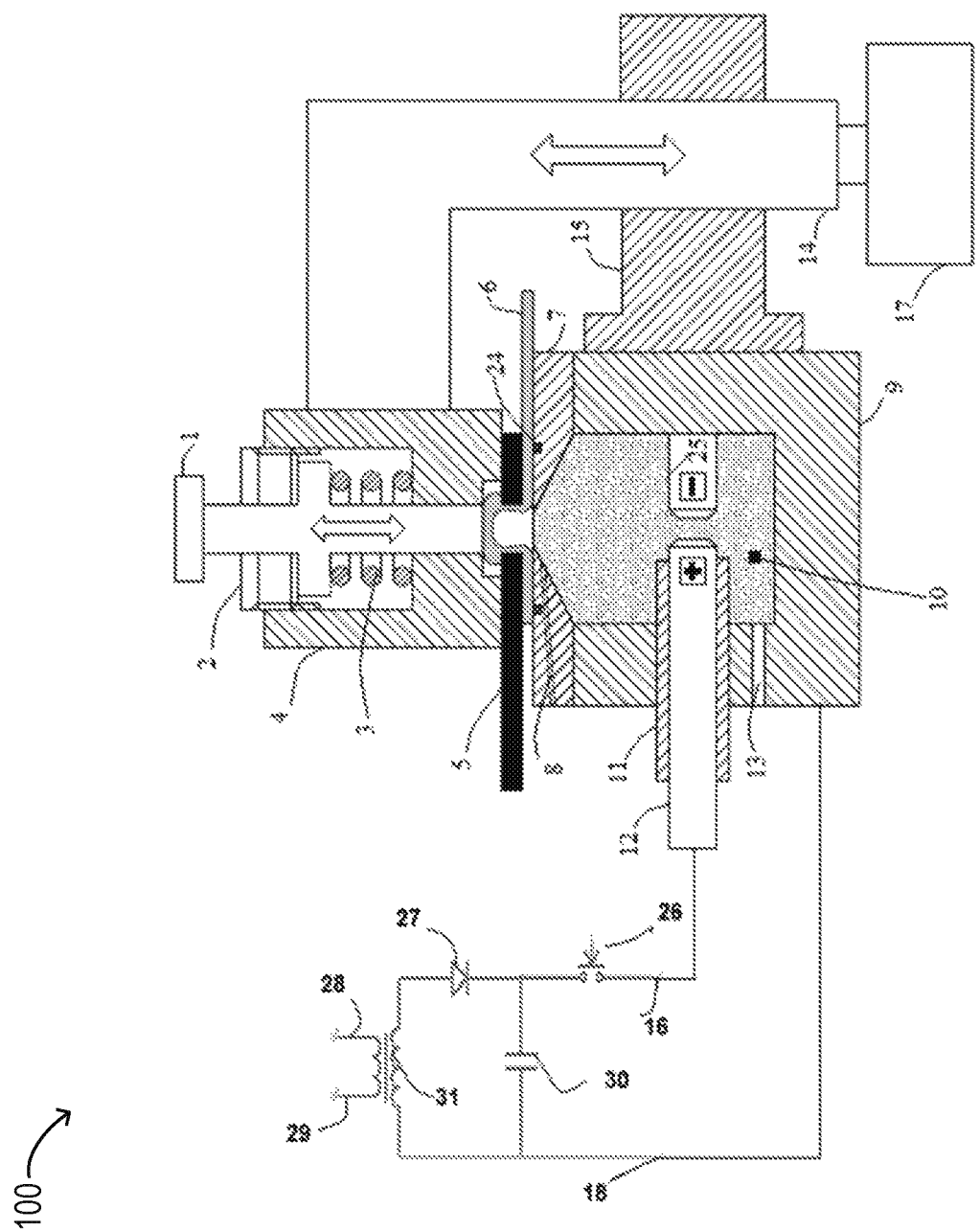

FIGS. 2A-2D depict four different stages of the improved electro-hydraulic clinching method performed in one implementation by the improved electro-hydraulic clinching system 100. FIG. 2A shows the first stage when the two second and first sheets 6 and 5 are placed on the top surface of the wave concentrator 7 before the movable casing 4 is lowered. FIG. 2B shows the process of moving the positioning rod 1 down to correctly align the hole of the first sheet 5 through the direction of the movable casing 4. FIG. 2C shows the stage when the first and the second sheets 5 and 6 are aligned correctly and the movable casing 4 is moved down to touch the first surface of the first sheet 5 and the pressure chamber is filled with the fluid. FIG. 2D, in turn, depicts how after the force of the fluid 10 is applied to the second sheet 6, sheet 6 is deformed by moving up to fill the hole of the first sheet 5 and enter the die cavity of the casing 4.

Figure 3:
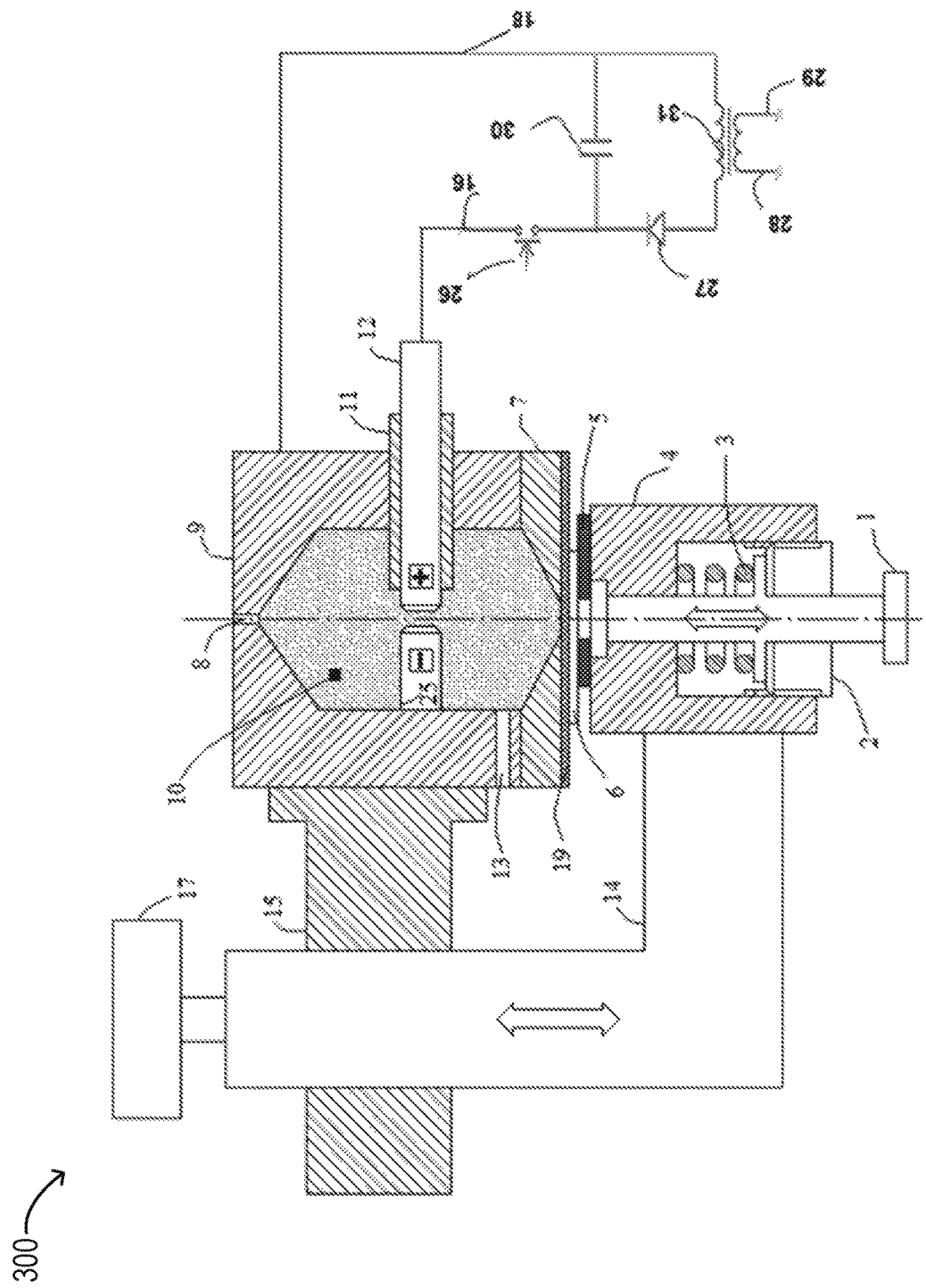
FIG. 3 is a schematic drawing of an alternative implementation for an improved electro-hydraulic clinching system.

FIG. 3 depicts an alternative implementation for an improved electro-hydraulic clinching system 300. Like the system 100, the electro-hydraulic clinching system 300 includes a movable positioning rod 1 which is housed in a movable casing 4. The movable casing 4 and the positioning rod 1 of system 300, however, are positioned in the bottom half of the system 300, as opposed to the top half in system 100. Thus, the system 300 is in some ways an inverted version of the system 100. For example, in system 300, the first sheet 5 is positioned underneath the second sheet 6. This provides a more efficient way of filling and conserving water during the process, for example, by using the pad 19 attached on the surface of wave concentrator 7. As in the system 100, the movable positing rod 1 and the casing 4 can the move up and down to correctly position a first sheet 5 and a second sheet 6 in the system 300 and facilitate their joining.

Functions of similarly numbered items in system 300 are similar to those of system 100. For example, the movable positing rod 1 and casing 4 of system 300 move together and their movement is controlled by a clamping system 17, in the same way as it does in system 100. The clamping system 17 includes a movable arm 14 attached to the casing 4.

In one implementation, before being placed on the top surface of the casing 4 of system 300, a hole is first created in the first sheet 5. To join the two sheets 5 and 6, in one implementation, the first sheet 5 is first placed on the top surface of the movable casing 4 of system 300, before placing the second sheet 6, which does not include a similar hole, on top of the first sheet 5. Care is taken to place the hole of the first sheet 5 over the cavity of the movable casing 4. The positioning rod 1 is used to ensure correct alignment such that the hole of sheet 5 aligns well with the opening of the pressure chamber 9. The system 300 also includes a pad 19, which, in one implementation, is placed between the bottom surface of the wave concentrator 7 and the second sheet 6. In one implementation, the pad 19 is a plastic or rubber pad. The pad 19 prevents the fluid 10 from flowing out of the opening in the cavity of the pressure chamber 9.

In one implementation, the top portion of the system 300 includes the pressure chamber 9 which is similar to and functions similarly as pressure chamber 9 of system 100 and includes a large cavity for housing the fluid 10. The pressure chamber 9 of system 300 also includes an inlet port 13 on the pressure chamber 9 for creating a path through which a fluid can travel from the outside into the pressure chamber. The opening of the channel 13 on the outer surface of the pressure chamber 9 can be connected to a pipe or other element through which a fluid can pass to enter the pressure chamber 9. In one implementation, the pressure chamber also includes an output channel 8 through which any air trapped inside the cavity can exit as the cavity of the pressure chamber is filled with the fluid 10. In the system 300, the output channel 8 is located at the very top of the pressure chamber 9 to ensure proper and efficient evacuation of air.

In one implementation, the top portion of the system 300 also includes the wave concentrator 7 having an opening which is connected to an opening of the cavity of the pressure chamber 9 through which the fluid 10 can move. The shape of the wave concentrator 7 reinforces the cone-head shape of the cavity of the pressure chamber 9, resulting in an increased concentration of shock wave at the bottom of the cavity. In one implementation, the pressure chamber 9 is connected to the insulator 11 which houses the electrode 12. The opposing electrode 25 is located across the cavity of the pressure chamber 9 to generate an electric discharge in the fluid 10. In one implementation, the electrode 12 is connected to the switch 26 which is in turn connected to the capacitor 30 and the diode 27. The negative pole of capacitor 30 is connected to the body of the pressure chamber 9 through the electrical connection 18. The diode 27 and capacitor 30 are both connected to a high voltage transformer 31. By closing the diode 27, the high voltage transformer 31 becomes connected to the capacitor 30 and charges it. Then, opening the diode 27 and closing switch 26 causes the large amount of electrical energy stored in the capacitor 30 to create a large potential difference between the electrodes 12 and 25, which leads to an electrical discharge between the electrodes. This creates a plasma channel between the electrode 25 and the electrode 12. The sudden expansion of this plasma channel can create a shock wave in the fluid 10, which spreads throughout the fluid 10 in the cavity and moves the fluid down to flow through the opening of the cavity and strike the pad 19 with a force that causes the second sheet 6 to move. The concentrated energy and suddenly applied force of the charged fluid causes a deformation in the second sheet 6 such that materials of the second sheet 6 pass through the hole of the sheet 5 and touch the top surface of the movable casing 4. Because of the shape of the die cavity of casing 4, when the second sheet 6 touches the bottom of the die cavity, further axial movement of the second sheet 6 is not possible. As a result, when moving through the predrilled hole of the first sheet 5, the second sheet 6 flows radially and fills the hole of the first sheet 5. This leads to a joining of the first sheet 5 to the second sheet 6 at the hole of the first sheet 5.

Figure 4:
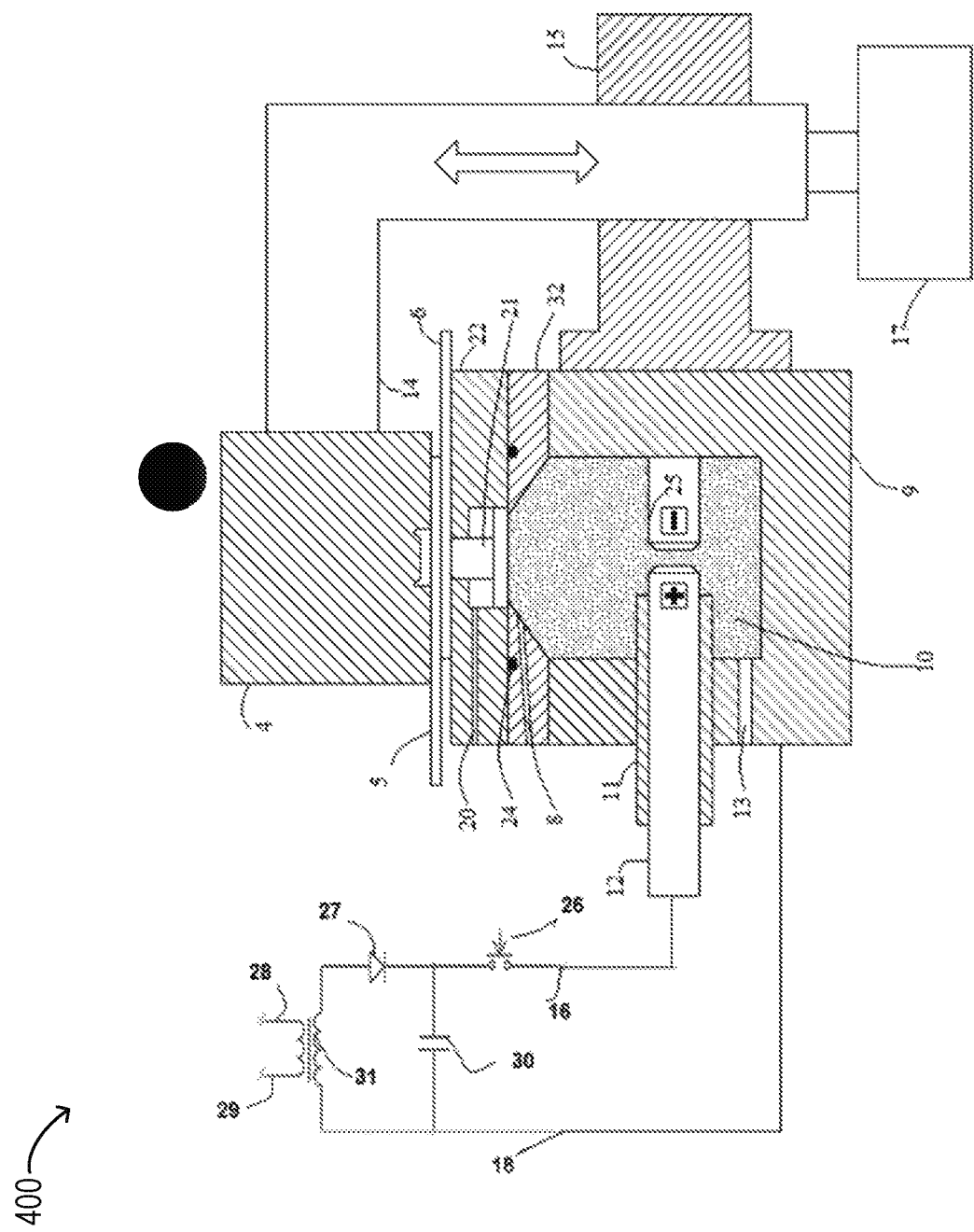
FIG. 4 is a schematic drawing of another alternative implementation for an improved electro-hydraulic clinching system.

FIG. 4 depicts another alternative implementation for an improved electro-hydraulic clinching system. Herein, the improved electro-hydraulic clinching system 400 of FIG. 4 is used to join two sheets together, without utilizing a hole in one of the sheets for the joining process. Instead, the improved electro-hydraulic clinching system 400 performs a clinching process that directly joins the two sheets together. Like the system 100, the improved electro-hydraulic clinching system 400 includes a top portion and bottom portion. The top portion includes a movable casing 4 which works similarly to the movable casing 4 of system 100. However, the movable casing 4 of system 400 does not include a positioning rod, as there is no need for aligning a hole of the first sheet with the cavity of the movable casing. Other like-numbered elements in the system 400 are similar to and function the same way as those shown in and discussed with respect to FIGS. 1 and 3.

The electro-hydraulic clinching system 400 is different, however, from the systems 100 and 300, in which the force of the fluid 10 is not directly applied to the first and/or second sheets. Instead, the pressure wave generated in the fluid 10 as a result of electrical discharge between the two electrodes 12 and 25 is applied to a piston 21. In one implementation, the piston 21 is positioned inside a housing 22 such that it can only move in the axial direction. The fast pivotal movement of the piston 21 applies a force to both the first and the second sheets 5 and 6 which are placed directly above the piston 21. The force of the piston is sufficient enough to cause deformation in both sheets, forcing both upwards into the cavity of the casing 4 and as a result joining the two sheets.

In one implementation, the system 400 includes an exit outlet 20 for allowing air to flow out of the housing 22 when it is moved upwards, thus reducing resistance to the upward movement of the pistol 21. System 400 also includes a wave concentrator 32 carrying out a similar function as that of the wave concentrator 7 of the system 100, but having a slightly different shape to accommodate the piston 21.

Figure 5:
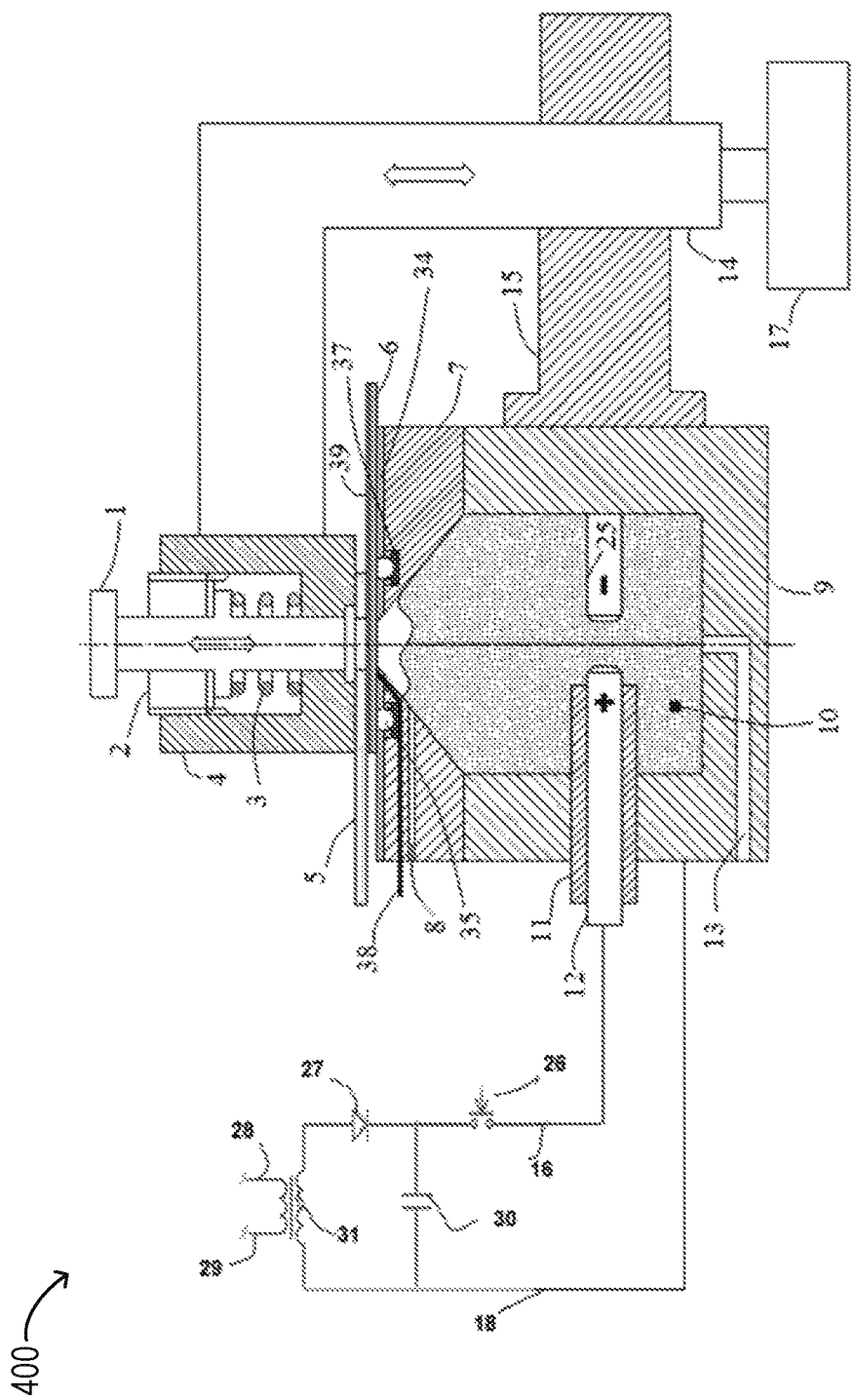
FIG. 5 is a schematic drawing of yet another alternative implementation for an improved electro-hydraulic clinching system.

FIG. 5 depicts yet another alternative implementation for an improved electro-hydraulic clinching system. The improved electro-hydraulic clinching system 500 of FIG. 5 utilizes hot clinching by increasing the temperature of one of the sheets before it is joined to the other sheet. Like the system 100, the improved electro-hydraulic clinching system 500 includes a top portion and bottom portion, each having similar elements as those of the top and bottom portions of system 100. However, system 500 also includes an insulating sheet 39, conducting wires 35, an insulating surface 34, insulators 37, and a thermometer 38. In system 500, the second sheet 6 is placed on an insulating surface 34 which is itself located on the surface of the wave concentrator 7. An insulating sheet 39 may then be placed on top of the second sheet 6, before placing the first sheet 5 on top of the second sheet 6. In one implementation, the insulation sheet 39 is a thin sheet designed to insulate the first sheet 5 from the heat of the second sheet 6, and prevent the heat transfer of the second sheet 6 to the first sheet 5 during the application of electrical current, which could affect the mechanical properties of the joint.

The conducting wires 35 are used to heat the second sheet 6. In one implementation, the conducting wires 35 are connected to a transformer (not shown). When the transformer is turned on, the electrical current flows through the conducting wires 35 and the part of second sheet 6 which is between the conducting wires. Due to the electrical resistivity of the second sheet 6, the electrical current heats this section of the second sheet 6 by electrical resistance heating. Other methods of heating the second sheet 6 are also contemplated. The pressure chamber 9 is not completely filled using the fluid 10 and between the second sheet 6 and the fluid 10 an air gap is generated. If this gap does not exist, the contact of fluid 10 with the second sheet 6 prevents its heating. Insulators 37 are used, in one implementation, to insulate the wires 35 from the wave concentrator 7. The thermometer 38 is used to measure the temperature of the second sheet 6. Once the measured temperature indicates that the temperature of the sheet has reached to a desirable degree, the switch 26 is closed to create the shock wave in the fluid 10. The shock wave moves the fluid 10 to the second sheet 6 to join it to the first sheet 5 in a similar manner as that of system 100. However, in this case, the second sheet 6 is hot when it is joined to the first sheet 5. The forming speed of the second sheet 6 is fast enough that the fluid 10 does not have a chance to decrease the temperature of the second sheet 6 before they are joined. However, immediately after joining, because of contact with the fluid 10, the second sheet 6 is cooled down. This creates a Martensite-like structure at the joining point of the two sheets which exhibits very high strength. The bond strength between the two sheets created it in this manner is thus higher than those created using other clinching techniques.

In one implementation, the pressure chamber 9 of system 500 is not fully filled with the fluid 10. This is to prevent direct contact between the fluid 10 and the second sheet 6, which can prevent cooling the second sheet 6 before the shock wave is applied.

Figure 6:
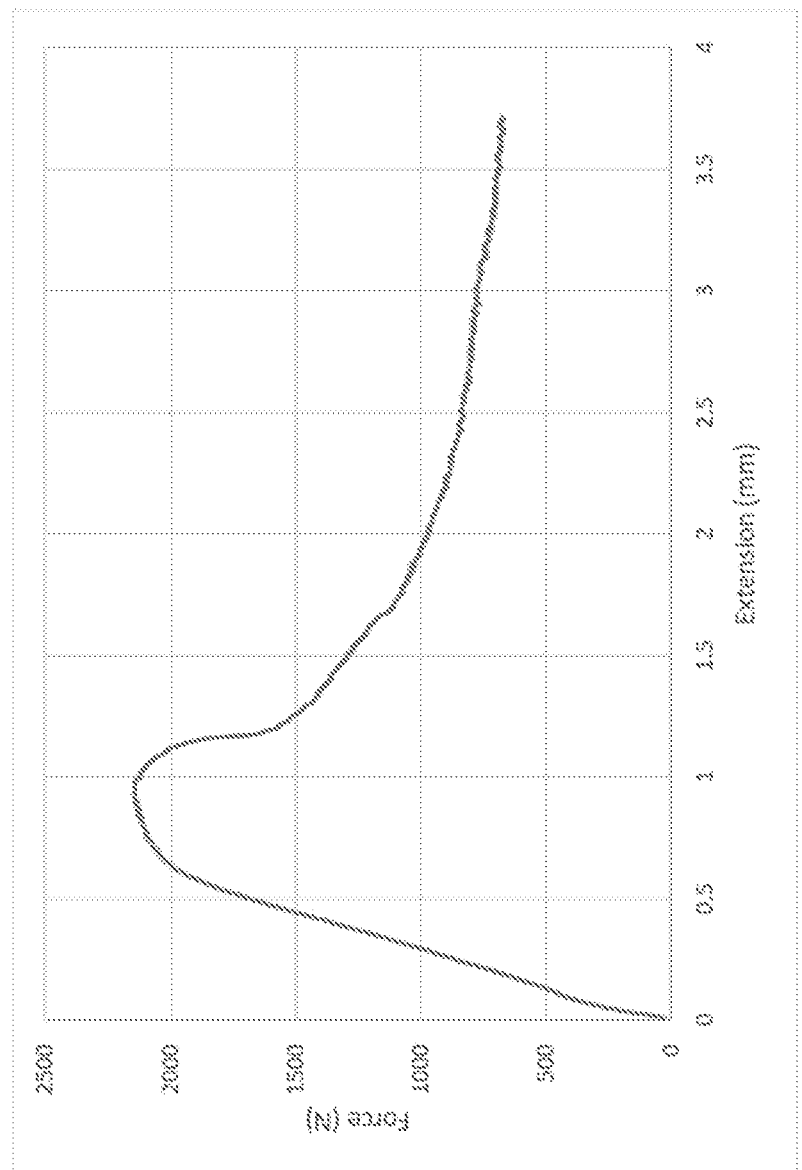
FIG. 6 is a chart demonstrating the strength of a joint forced between two sheets using an improved electro-hydraulic clinching system, according to an implementation.

FIG. 6 is a chart showing the shear strength of a joint created between an aluminum alloy (e.g., AA3105) sheet with a thickness of 1 mm and a steel sheet with a thickness of 0.5 mm. The chart of FIG. 6 shows that such a joined connection can withstand a substantial force, e.g., of about 2140 Newton.

Accordingly, the improved electro-hydraulic clinching system provides an efficient and simple system for joining metal alloys that can be used with sheets of different materials and different thicknesses. The device is easy and inexpensive to operate and it saves time which results in further cost savings.

The separation of various components in the examples described above should not be understood as requiring such separation in all examples, and it should be understood that the described components and systems can generally be integrated together in a single packaged into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

What is claimed is:

1. An electro-hydraulic clinching system for joining a first sheet to a second sheet comprising:
    a movable casing having a positioning rod for aligning a hole in the first sheet with a die cavity of the movable casing;
    a pressure chamber including a cavity for housing a fluid;
    two opposing electrodes, one located on one side of the pressure chamber cavity and the other located on the other side of the pressure chamber cavity;
    a channel for inputting the fluid in the cavity for housing the fluid,
    wherein a discharge of electric current between the two opposing electrodes creates a shock wave in the fluid that causes the fluid to move with force against the second sheet, and the force causes deformation in the second sheet by moving materials of the second sheet into the hole of the first sheet thereby joining the first and second sheets.

2. The electro-hydraulic clinching system of claim 1, further comprising a movable arm connected to the movable casing for moving the movable casing.

3. The electro-hydraulic clinching system of claim 1, further comprising a clamping system for controlling a movement of the movable arm.

4. The electro-hydraulic clinching system of claim 1, further comprising an output channel for releasing any air trapped inside the cavity for housing the fluid as the cavity is filled with the fluid.

5. The electro-hydraulic clinching system claim 1, further comprising a wave concentrator, the wave concentrator being cone-shaped on at least one end to concentrate the shock wave in the fluid toward the first and the second sheets.

6. The electro-hydraulic clinching system of claim 5, further comprising a fluid inlet port on a lower end of the pressure chamber configured to be connected to a pipe or other element through which the fluid can pass to enter into the cavity.

7. The electro-hydraulic clinching system of claim 1, wherein the pressure chamber is located on a bottom portion and the movable casing is located on a top portion of the electro-hydraulic clinching system.

8. The electro-hydraulic clinching system of claim 7, wherein the second sheet is positioned on top of the pressure chamber.

9. The electro-hydraulic clinching system of claim 8, wherein the first sheet is positioned above the second sheet and below the bottom surface of the movable casing such that the first sheet and the second sheet are located between the movable casing and the pressure chamber.

10. The electro-hydraulic clinching system of claim 1, wherein the pressure chamber is located on a top portion and the movable casing is located on a bottom portion of the electro-hydraulic clinching system.

11. The electro-hydraulic clinching system of claim 10, wherein the first sheet is positioned on top of the top surface of the movable casing and the second sheet is positioned above the first sheet such that the first sheet and the second sheet are located between the movable casing and the pressure chamber.

12. The electro-hydraulic clinching system of claim 11, further comprising a pad positioned above the second sheet and adjacent to the pressure chamber.

13. The electro-hydraulic clinching system of claim 12, wherein the pad is configured to move with the force of the fluid thus moving the material of the second sheet into the opening of the first sheet.

14. An electro-hydraulic clinching system for joining a first sheet to a second sheet comprising:
    a casing;
    a pressure chamber including a cavity for housing a fluid;
    two opposing electrodes, one located on one side of the cavity for housing the fluid and the other located on the other side of the cavity for housing the fluid;
    a channel for inputting the fluid in the cavity for housing the fluid; and
    a movable piston positioned on top of the cavity for housing the fluid,
    wherein an electric discharge between the two opposing electrodes creates a shock wave in the fluid that causes the fluid to move against the piston causing the piston to move and thereby create a force against the second sheet and the first sheet positioned on top of the second sheet, and the force causes deformation in the first sheet and the second sheet by moving materials of the first sheet and the second sheet into a die cavity of the casing thereby joining the first sheet to the second sheet.

15. The electro-hydraulic clinching system claim 14, further comprising a wave concentrator, the cavity of wave concentrator being cone-shaped on at least one end to concentrate the shock wave of the fluid.

16. The electro-hydraulic clinching system of claim 15, further comprising a portion attached to the pressure chamber on a lower end of the pressure chamber.

17. The electro-hydraulic clinching system of claim 14, wherein the pressure chamber is located on a bottom portion and the movable casing is located on a top portion of the electro-hydraulic clinching system.

18. The electro-hydraulic clinching system of claim 17, wherein the second sheet is positioned on top of the pressure chamber.

19. The electro-hydraulic clinching system of claim 18, wherein the first sheet is positioned above the second sheet and below the bottom surface of the movable casing such that the first sheet and the second sheet are located in between the movable casing and the pressure chamber.

20. The electro-hydraulic clinching system of claim 14, further comprising a housing for the movable piston.

\* \* \* \* \*